2,787,610

PROCESS OF POLYMERIZING ACRYLONITRILE IN A MIXTURE OF AN AQUEOUS LIQUID AND A LIQUID NON POLYMERIZABLE HYDROCARBON

Henricus Josephus Hubertus Janssen, Nimeguen, Netherlands, assignor to Naamlooze Venncotschap Kunstzijdespinnerij Nyma, Nimeguen, Netherlands, a limited liability company of the Netherlands No Drawing. Application January 12, 1953,
Serial No. 330,895

Claims priority, application Netherlands January 14, 1952

2 Claims. (Cl. 260—88.7)

This invention relates to a process of polymerisation of certain polymerisable organic substances from monomeric substances by catalytic action. It is more particularly concerned with the polymerisation of acrylonitrile for the production of threads fit for the spinning process.

It is one object of this invention to provide a new process for the polymerisation of acrylonitrile alone or with other polymerisable substances admixed to it, which yields the polymers in a condition where they are particularly fit for spinning from narrow spinnerets for the production of very thin and homogeneous threads.

It is another object of this invention to provide a process of production of polymerised acrylonitrile and other products which can be carried out with full success at high speed.

Although the polymerization of acrylonitrile in the presence of a persulfate catalyst and a reducing material (activator), such as sulfite, bisulfite or polyhydric phenol, in the absence of oxygen has long been known to the art, it has not heretofore been possible in general to produce the polymeric product with a sufficiently uniform molecular weight.

The polymers obtained according to most of the known processes hitherto devised have been found to consist of mixtures of polymers of higher and of lower molecular weight. Obviously the difference in the weight of the molecules renders the spinning solutions containing these polymers unhomogeneous and consequently threads spun with the aid of such products will not possess the homogeneity required to render them strong enough for the spinning and subsequent working up operations.

The products obtained according to known processes, as a rule, contain molecules of an extraordinarily high weight and these polymers have been shown to dissolve only incompletely and to have the tendency of forming gel particles. The presence of such particles, which cannot be removed by filtration from the solutions of polyacrylonitrile, causes disturbances during the spinning and this is particularly true when making threads with a low single denier, in which spinnerets with very narrow openings must be used.

The polymers obtained according to the present invention distinguish from similar products hitherto made by the great uniformity in size of their molecules, this being due partly to the circumstance that polymerisation is effected in the aqueous phase in which the concentration of the monomers remains practically constant during the entire polymerisation process and this without the use of emulsifiers. Obviously, the absence of emulsifiers contributes to the formation of a very pure polymer, which does not contain molecules which, on dissolving, form gel particles in the solution. The solutions of this polymer appear to be completely homogeneous and therefore during spinning not the slightest difficulty due to clogging of the spinnerets, is encountered.

Another advantage offered by the process according to this invention is the fact, that the polymer formed in it, considering its physical condition after filtration, washing and drying, is particularly suitable for the further working up operations. For instance, it is not necessary to grind the dried polymer before dissolving it, so that one of the steps hitherto used in the production of such polymers can be dispensed with altogether.

Another advantage offered by the polymerisation of an approximately saturated solution of acrylonitrile in water is provided by the circumstance that per unit, by volume, of the reaction mixture a larger quantity of acrylonitrile can be polymerised, so that the preparation of a predetermined quantity of polymers according to the process of the present invention, requires an apparatus of smaller size.

An outstanding feature of the process according to this invention consists therein that the concentration of the monomer acrylontrile and of the other monomers, which may be admixed to it in the aqueous solution, free from emulsifiers, is kept constant by vigorous stirring during polymerisation with a solution of acrylonitrile, which may also contain other monomers, in one or more organic solvents which are practically non-water-miscible and in which the polymerisation catalyst cannot practically be dissolved.

In contrast to the polymers obtained in the processes hitherto suggested for this purpose, the polymer obtained in the process according to this invention, is very homogeneous as far as the size of its molecules is concerned.

The quantities of the catalyst and of the activator should be so chosen that rapid polymerisation of a product possessing the desired uniform molecular weight is obtained.

I can use as saturated hydrocarbons pentane, isopentane, hexane, isohexane, heptane and isoheptane, cyclopentane, cyclohexane, cycloheptane, etc. or mixtures of these substances. If desired, also other saturated hydrocarbons can be used provided they satisfy the requirements of miscibility in all proportions with acrylonitrile and non-miscibility with water.

As aromatic hydrocarbons I can, for instance, use benzene and toluene.

Polymerisation should preferably be carried out in an atmosphere free from oxygen. This can be achieved by replacing the air by an inert gas, for instance by effecting polymerisation under the protection of a current of nitrogen.

The temperature at which polymerisation takes place, may vary within wide limits, but I prefer to operate at a temperature and with quantities of catalyst and the activator, which allow polymerisation to occur at a favorable speed and which yield a polymerised product of uniform molecular weight.

The new process is not limited to reaction at atmospheric pressure and it can also be carried out continuously.

As a matter of course, the material of which the reaction vessel is composed should not influence polymerisation in an unfavorable manner. Containers and other parts consisting of glass, enamel, nickel, aluminum and certain kinds of stainless steel are suitable.

I prefer the acidity of the reaction mixture to range between pH values of 2 and 5.

The new process can also be applied with advantage to the preparation of copolymers, provided monomer compounds cooperating in the copolymerisation satisfy the requirement of solubility in the water phase and solubility in the organic phase.

In the copolymerisation a product is obtained which contains a constant proportion of its constituents, since the proportion of the monomer concentrations in the water phase remains practically constant. The copolymer will also be very uniform as far as the size of the molecules is concerned, because the monomer concentrations in the water phase remain practically constant during the process.

Polymerisation or copolymerisation may also take place in an aqueous medium, in which have been dissolved salts in the solution of which acrylonitrile is less soluble than in water. In that case the speed of polymerisation is lower and it is easier to keep the temperature during polymerisation constant.

Since the polymerisation speed is one of the factors which influences the average molecular weight of the polymers formed, this way of proceeding forms a means for influencing the molecular weight of the polymer.

If the polymerisation of acrylonitrile is carried out in the presence of heptane and water, the proportion, by weight, of acrylonitrile and water may range between 0.04 and 2.4, the proportion of heptane and acrylonitrile between 0.15 and 8. It is, however, possible also to carry out polymerisation with other proportions of the components of the reaction mixture.

In the carrying out of the process according to this invention I may, for instance, proceed as follows:

Example I

A mixture of 191 parts by weight acrylonitrile, 57 parts heptane and 892 parts water is heated under stirring to 55° C., the pH of the water phase being kept constant between 2 and 3 during the reaction. The oxygen in the air surrounding the reaction vessel is displaced by means of a current of nitrogen gas. As polymerisation catalyst was used 0.5% ammonium persulfate calculated on the quantity of acrylonitrile present. The reaction is activated by 1.0% sodium metabisulfite also calculated on the acrylonitrile present.

When 135 parts of acrylonitrile have been converted into polymer, the reaction is interrupted and the product is filtered, washed and dried in a well known manner. The intrinsic viscosity of the polymer formed, which was determined in dimethyl formamide, is equal to 2.66. This intrinsic viscosity is calculated in accordance with the equation:

$$\lim_{c \to 0} \frac{\eta_{sp}}{c} = [\eta] \text{ (the intrinsic viscosity)}$$

In this equation $\eta_{sp}$ represents the specific viscosity while $c$ is the concentration in grams of polymer per 100 cubic cms. of the solution.

The dried product can be dissolved in dimethyl formamide without any further treatment.

When polymerisation is repeated and samples are taken from the reaction mixture during polymerisation, it will be found that the polymer which can be separated from the mixture, has an intrinsic viscosity which ranges between 2.62 and 2.69.

Solutions of the polymer in concentrations ranging between 15% and 25% do not create any disturbances during extrusion from the spinnerets. The thread obtained by spinning is altogether homogeneous throughout its entire length and no rupture of the filaments occurs during spinning.

After hot stretching a thread of superior quality is obtained.

Example II 189 parts acrylonitrile are stirred in 105 parts heptane and 824 parts water and the mixture is heated up to 55° C. This temperature is kept constant during the polymerisation. The catalyst used in this case was 0.5% ammonium persulfate and the activator was 1.0% metabisulfite, both calculated on the quantity of acrylonitrile present.

When 125 parts of the monomer were converted into polyacrylonitrile, the reaction was stopped and the filtrate was washed and dried. The polymer had an intrinsic viscosity of 2.58. Samples of the monomer taken during the reaction had an intrinsic viscosity ranging between 2.55 and 2.60. Solutions of this polymer in dimethyl formamide could be extruded without any difficulty. The thread obtained in spinning was of an excellent quality.

Example III

When polymerisation was carried out with the same quantities of substances as described with reference to Example II, however at a temperature of 45° C., the polymer obtained showed an intrinsic viscosity of 3.13. Its spinning properties were very good.

Example IV 162 parts acrylonitrile were polymerised with 838 parts water and 57 parts pentane in the presence of 0.7% ammonium persulfate and 1.4% sodium metabisulfite, the temperature being kept at 30° C. and the pH at 3.0, until 106 parts acrylonitrile were converted into polymer.

The intrinsic viscosity of the polymer, determined in dimethyl formamide solution, amounted to 3.19.

Example V 161 parts acrylonitrile were polymerised in 810 parts water and 72 parts hexane in the presence of 0.6% ammonium persulfate as catalyst and 1.2% sodium bisulfite as activator. The temperature of the mixture was kept at 55° C., the pH at 3.0.

There were converted 97 parts having an intrinsic viscosity of 2.43.

Example VI 158 parts acrylonitrile were polymerised in 852 parts water and 51 parts isohexane in the presence of 0.5% ammonium persulfate and 1.0% sodium metabisulfite. The temperature was kept at 50° C. and the pH at 3.0.

102 parts acrylonitrile were converted into polymer, the intrinsic viscosity of which was found to be 2.80.

Example VII 166 parts acrylonitrile were polymerised in 848 parts water and 71 parts benzene free from thiophene. The catalyst was 0.7% ammonium persulfate, the activator 1.4% sodium metabisulfite. The temperature was kept at 50° C., the pH at 3.0.

There were converted 110 parts acrylonitrile and the product showed an intrinsic viscosity of 2.40.

Example VIII 161 parts acrylonitrile were polymerised in 810 parts water and 95 parts toluene free from thiophene. 0.5% ammonium persulfate were used as catalyst and 1.0% sodium metabisulfite as the activator, the temperature being kept at 55° C., the pH at 3.0.

There were converted in this test 97 parts acrylonitrile having an intrinsic viscosity of 2.62.

Example IX 164 parts acrylonitrile were polymerised in 830 parts water and 56 parts isopentane. 0.8% ammonium persulfate were present as catalyst and 1.6% sodium metabisulfite as activator. The temperature was kept at 25° C. and the pH at 3.0.

100 parts acrylonitrile were converted into polymer and the intrinsic viscosity of the product was found to be 3.10.

Example X 170 parts acrylonitrile were polymerised in 820 parts water and 77 parts cyclohexane in the presence of 0.6% ammonium persulfate as catalyst and 1.2% sodium metabisulfite as activator, the temperature being kept at 60° C. and the pH at 2.0.

106 parts acrylonitrile were converted and the product showed an intrinsic viscosity of 2.20.

In all the operations hereabove described the solution or mixture was free from any emulsifier and was stirred vigorously during the entire operation.

In every case the polymer obtained was found to consist of very uniform molecules.

The polymers obtained in accordance with the examples were dissolved in dimethyl formamide and were extruded from the spinnerets without any difficulty. In all the cases the quality of the threads obtained was excellent.

Various changes may be made in the steps and materials described above without departing from the invention or sacrificing the advantages thereof.

I claim:

1. The process of polymerising acrylonitrile which comprises vigorously stirring the acrylonitrile in a mixture free from emulsifiers, of an aqueous liquid and a liquid non-polymerisable hydrocarbon.

2. The process of claim 1, in which the liquid hydrocarbon is selected from the group consisting of pentane, isopentane, hexane, isohexane, cyclopentane, cyclohexane, cycloheptane, benzene, toluene and a mixture of at least two of said compounds.

References Cited in the file of this patent

UNITED STATES PATENTS

| | | |
|---|---|---|
| 2,471,743 | Harrison | May 31, 1949 |
| 2,656,334 | D'Alelio | Oct. 20, 1953 |
| 2,675,370 | Barrett | Apr. 13, 1954 |

OTHER REFERENCES

Bacon: Trans. Faraday Soc., vol. 42, pages 140–155 (1946).